United States Patent [19]

Tietjen et al.

[11] Patent Number: 4,683,534
[45] Date of Patent: Jul. 28, 1987

[54] METHOD AND APPARATUS FOR INTERFACING BUSES OF DIFFERENT SIZES

[75] Inventors: Donald L. Tietjen; Michael W. Cruess, both of Austin, Tex.

[73] Assignee: Motorola, Inc., Schaumburg, Ill.

[21] Appl. No.: 745,477

[22] Filed: Jun. 17, 1985

[51] Int. Cl.$^4$ ............................................. G06F 3/00
[52] U.S. Cl. ............................................................ 364/200
[58] Field of Search ... 364/200 MS File, 900 MS File

[56] References Cited

U.S. PATENT DOCUMENTS

| | | | |
|---|---|---|---|
| 3,978,456 | 8/1976 | Moran | 364/200 |
| 4,237,543 | 12/1980 | Nishio et al. | 364/200 |
| 4,296,469 | 10/1981 | Gunter et al. | 364/200 |
| 4,309,754 | 1/1982 | Dinwiddie | 364/200 |
| 4,371,928 | 2/1983 | Barlow | 364/200 |
| 4,447,878 | 5/1984 | Kinnie et al. | 364/200 |

Primary Examiner—David Y. Eng
Attorney, Agent, or Firm—John A. Fisher; Jeffrey Van Myers

[57] ABSTRACT

In a data processing system having a first bus sized to accomodate $2^x$ units of data and a second bus sized to accomodate $2^y$ units of data, where x and y are positive integers and y is less than or equal to x, a method and apparatus for determining y from the x least significant bits of a control address, concatenated with a decode control bit, and then decoding the (x−y) most significant bits of the x control address bits to determine which of x data unit transceivers coupled between the first and second buses should be enabled.

4 Claims, 5 Drawing Figures

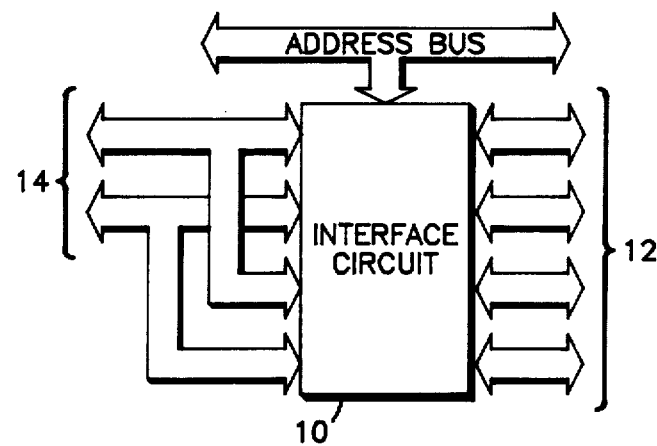
FIG. 3
FIG. 4
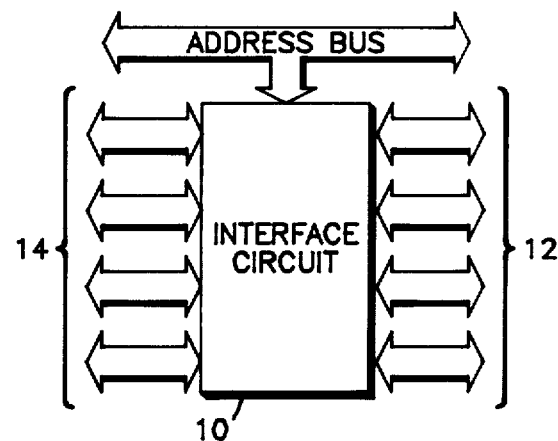
FIG. 5
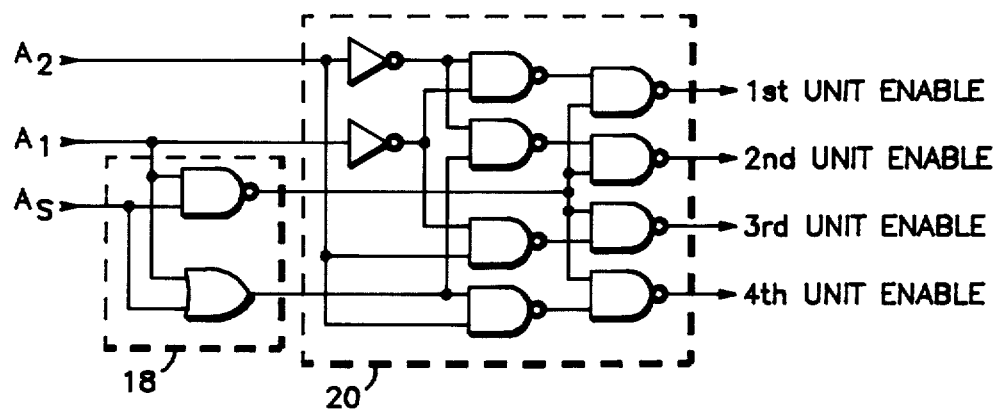

4,683,534

METHOD AND APPARATUS FOR INTERFACING BUSES OF DIFFERENT SIZES

CROSS REFERENCE TO RELATED APPLICATIONS

Related subject matter is disclosed in U.S. Pat. No. 4,633,437, entitled DATA PROCESSOR HAVING DYNAMIC BUS SIZING, invented by David S. Mothersole, Lester M. Crudele, James L. Tietjen and Robert R. Thompson, and assigned to the Assignee hereof.

BACKGROUND OF THE INVENTION

In general, the various operating components of a data processing system are designed to communicate using a data bus having a fixed size. Typically, each component is in turn designed to operate internally using a data bus of the same size. In such systems, the circuitry for interfacing the external data bus to the internal data bus can be relatively straightforward, concerning itself primarily with timing.

In contrast, some systems include components which have internal data buses which are not the same size as the external data bus. For example, it may be desirable to combine a peripheral controller which operates internally using an 8-bit bus with a microprocessor which utilizes a 16-bit external bus. Similarly, it may be advantageous to utilize a special purpose processor which operates internally using a 32-bit bus with a general purpose microprocessor which uses a 16-bit external bus.

In those systems which, for whatever reason, have a size difference between the external bus and the internal data bus of a system element, the interface circuit must compensate for the size difference. One such circuit is described in U.S. Pat. No. 4,633,437, entitled DATA PROCESSOR HAVING DYNAMIC BUS SIZING. In this circuit, each component provides a size signal to the processor indicating the width, in discrete data units, of that particular component's data bus. Upon decoding the size signal, the circuit selectively enables one or more multiplexors to couple the data units comprising the peripheral component's data bus to respective data units of the processor's data bus. This solution, while effective for a component such as a processor which may interact on a cycle-to-cycle basis with components having multiple unique bus configurations, is overly complex and rather expensive in circuitry for a component which does not need to reconfigure on a dynamic basis.

One other example of a circuit which can respond on a cycle-by-cycle basis to data unit misalignment is described in U.S. Pat. No. 4,507,731. In this circuit, multiple transceivers are selectively enabled by address misalignment detection circuitry in order to present to the external bus a predictable alignment of the data units, regardless of the true alignment within the component, in this example a memory. Again, since address misalignment may occur on any cycle, the circuitry is overly complex for a component which is not subject to these same address misalignment problems.

SUMMARY OF THE INVENTION

Accordingly, it is an object of the present invention to provide a method for interfacing a first bus sized to accomodate a first number of data units to a second bus sized to accomodate a selected submultiple of data units.

Another object of the present invention to provide a circuit for interfacing a first bus sized to accomodate a first number of data units to a second bus sized to accomodate a selected submultiple of data units.

In carrying out these and other objects of the present invention, there is provided, in one form, a circuit for interfacing a first data bus sized to simultaneously accomodate $2^x$ units of data to a second data bus sized to accomodate $2^y$ units of data, where x and y are both integers and y is less than or equal to x. In particular, the circuit includes a size decoder adapted to receive as a size control signal the $(x^{-1})$ least significant bits a control address and a decode control bit, the size decoder providing a size select signal indicative of the number y of consecutive least signficant bits of the size which are equal to one (1). An address decoder, responsive to the size select signal and adapted to receive the x control address bits, provides $2^x$ unit enable signals indicative of the encoding of the $(x-y)$ most significant bits of the x control address bits. Transceivers, responsive to the unit enable signals, couple each unit of the first bus to a selected unit of the second bus in response to a respective one of the unit enable signals.

BRIEF DESCRIPTION OF THE DRAWINGS

FIG. 3 illustrates how the interface circuit of FIG. 1 may be coupled between a first bus having a certain size and a second bus which is one-half the size of the first bus.

FIG. 4 illustrates how the interface circuit of FIG. 1 may be coupled between a first bus having a certain size and a second bus which is the same size as the first bus.

FIG. 5 is a schematic diagram of a preferred embodiment of the interface circuit of FIG. 1 capable of operating in the examples shown in FIGS. 2, 3 and 4.

DETAILED DESCRIPTION OF THE INVENTION

Figure 1:
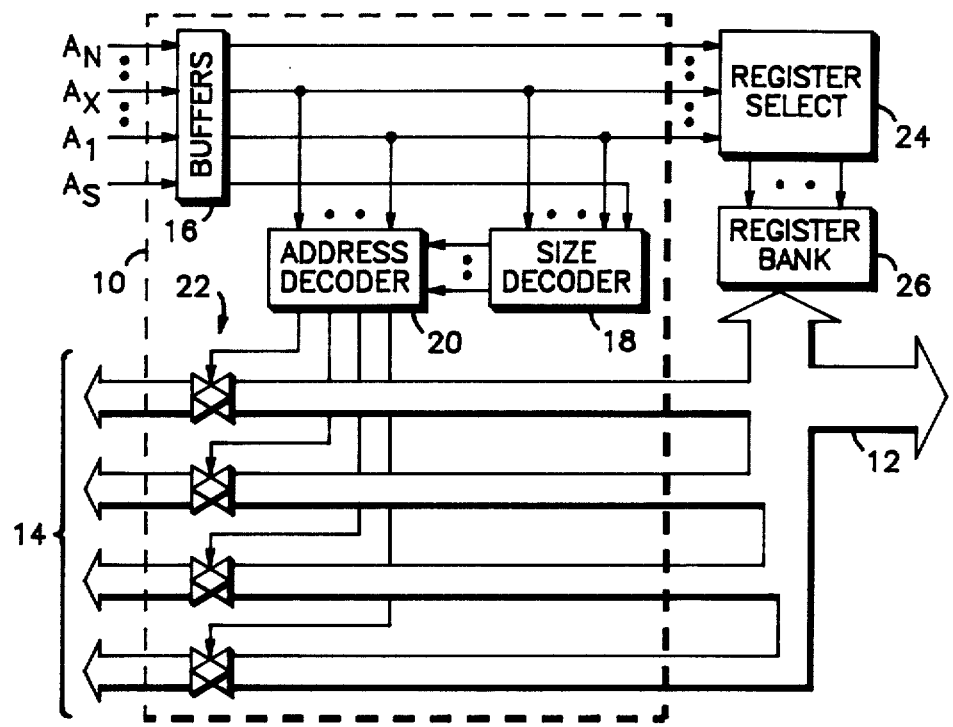
FIG. 1 is a block diagram of an interface circuit constructed in accordance with the present invention.
Figure 2:
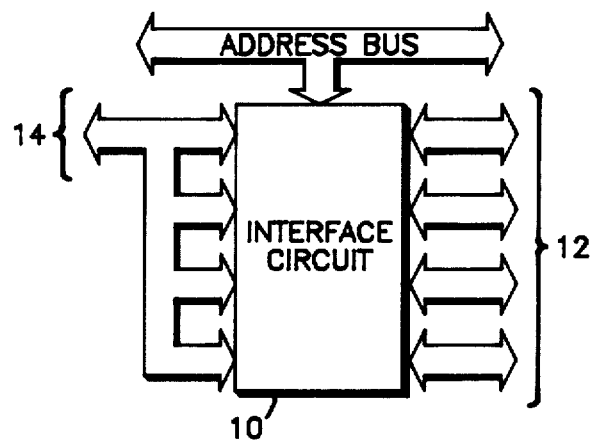
FIG. 2 illustrates how the interface circuit of FIG. 1 may be coupled between a first bus having a certain size and a second bus which is one-fourth the size of the first bus.

Shown in FIG. 1, is a circuit 10 for interfacing a first bus 12 to a second bus 14. In general, the first bus 12 is sized to accomodate $2^x$ units of data, while the second bus is sized to accomodate $2^y$ units of data, where x and y are both integers and y is less than or equal to x. In the illustrated form, x is equal to two (2) and y may be zero (0), one (1) or two (2), as appropriate. For example, assuming a data unit of 8-bits, the first bus 12 would be 32-bits wide. If, in a specific system, y is zero (0), then the second data bus 14 would be 8-bits wide and the interface circuit 10 would be coupled as shown in FIG. 2. If, instead, y is one (1), then the second data bus 14 would be 16-bits wide and the interface circuit 10 would be coupled as shown in FIG. 3. On the other hand, if y is two (2), then the second data bus 14 would be 32-bits wide and the interface circuit 10 would be coupled as shown in FIG. 4.

In general, the circuit 10 is comprised of a set of input buffers 16, a size decoder 18, an address decoder 20 and a set of bidirectional transceivers 22. Each of the input buffers 16 buffers a respective one of n control address bits An-A1, and one buffers a decode control bits As. the buffered control address bits $(x^{-1})$-A1 are logically concatenated with the buffered decode control bit As and provided to the size decoder 18 as a size control signal. Size decoder 18 decodes the size control signal and provides a size select signal indicative of the number y of consecutive least significant bits of the size control signal which are equal to one (1). Address decoder 20 in turn decodes the x control address bits Ax-A1 according to the size select signal and provides $2^x$ unit enable signals indicative of the encoding of the (x−y) most significant bits of the x address control bits.

By way of example, in the illustrated form, the control address bits A2-A1 and the decoder control bit As would be decoded according to the following table:

TABLE 1

| Address | | | Size Control | Size control decode | | | | | |
|---|---|---|---|---|---|---|---|---|---|
| | | | | Unit Enables | | | | Data Unit Coupling | |
| A2 | A1 | As | trol | 4th | 3rd | 2nd | 1st | Bus 12 | −> Bus 14 |
| 0 | 0 | 0 | 0 | 0 | 0 | 0 | 1 | 1st 8-bits | −> 8-bits |
| 0 | 1 | 0 | 0 | 0 | 0 | 1 | 0 | 2nd 8-bits | −> 8-bits |
| 1 | 0 | 0 | 0 | 0 | 1 | 0 | 0 | 3rd 8-bits | −> 8-bits |
| 1 | 1 | 0 | 0 | 1 | 0 | 0 | 0 | 4th 8-bits | −> 8-bits |
| 0 | 0 | 1 | 1 | 0 | 0 | 1 | 1 | 1st 16-bits −> 16-bits | |
| 1 | 0 | 1 | 1 | 1 | 1 | 0 | 0 | 2nd 16-bits −> 16-bits | |
| x | 1 | 1 | 2 | 1 | 1 | 1 | 1 | 32-bits | −> 32-bits |

For example, if the decode control bit As is a zero (0), then all of the control address bits A2-A1 are decoded by the gate address decoder 20 to determine which of the four (4) unit enable signals should be provided so that the appropriate 8-bit data unit of the first address bus 12 will be coupled to the second bus 14. Since all of the data buffers 22 are connected in parallel as shown in FIG. 2, the interface circuit 10 effectively provides an 8-bit data path between the first bus 12 and the second bus 14.

On the other hand, if the decoder control bit As is a one (1) and the least significant control address bit A1 is a zero (0), then only the more significant control address bit A2 is decoded by the gate address decoder 20 to determine which two (2) of the four (4) unit enable signals should be provided so that the appropriate two (2) 8-bit data units of the first address bus 12 will be coupled to the second bus 14. Since the data buffers 22 are connected in pairs as shown in FIG. 3, the interface circuit 10 effectively provides a 16-bit data path between the first bus 12 and the second bus 14.

Finally, if both the decode control bit As and the least significant control address bit A1 are one (1), then the more significant control address bit A2 may be ignored (indicated by the "x" in Table 1) by the gate address decoder 20 since all four (4) unit enable signals should be provided so that all of the 8-bit data units of the first address bus 12 will be coupled to the second bus 14. Since the data buffers 22 are connected individually as shown in FIG. 3, the interface circuit 10 effectively provides a 32-bit data path between the first bus 12 and the second bus 14.

In a typical system application, such as that illustrated in FIG. 1, the buffered control address bits An-A0 would also be decoded by a conventional register select 24 to selectively couple a respective one of a plurality of registers in a register bank 26 to the first bus 12. In this form, the interface circuit 10 allows communication of data between the selected register and the second bus 14 via the first bus 12.

Shown in FIG. 5 is a schematic diagram of one implementation of the interface circuit 10 shown in FIG. 1 for performing the interface functions shown in Table 1. Although discrete logic has been shown in FIG. 5, other types of logic, such as programmable logic arrays (PLA's), may be used if desired. Such regular logic forms will be particularly efficient as the value of x increases above two (2). For example, it may be convenient to construct the size decoder 18 as a trailing one (1) detector (or conversely, a least significant zero (0) detector), the output of which would simply "don't care" the (y+1) least significant control address bits input into a PLA-type of address decoder 20. Alternatively, the output of the size decoder 18 could be used to "kill" the inappropriate outputs of the address decoder 20. Other suitable forms will readily occur to those skilled in the art.

In general, the size of the first data bus 12 will be fixed, that is, the size decoder 18 and the address decoder 20 will be designed for a particular value of x. Since the size of the second bus 14 may vary according to the requirements of the system, the size decoder 18 and the address decoder 20 must respond to different values of y. However, in all circumstances, the value of y is simple the number of consecutive least significant size control bits which are equal to one (1). Thus, the least significant size control bit which is zero (0) may be considered as a delimiter, dividing the y size-determining bits from the (x−y) enable-determining bits.

We claim:

1. In a data processing system comprising first and second buses, wherein the second bus is a $2^x$ sub-multiple of the first bus, x being a predetermined positive integer, a circuit for interfacing the first bus to the second bus, comprising:
  a size decoder for receiving as a size control signal the (x−1) least significant bits of a control address and a decoder control signal, the size decoder providing a size select signal indicative of the number y of consecutive least significant bits of the size control signal which are equal to logic one (1);
  an address decoder for receiving the x least significant bits of the control address and the size select signal, the address decoder providing $2^2$ enable signals indicative of the encoding of the (x−y) most significant bits of the x control address bits; and
  $2^x$ sets of buffers, each set coupling a selected portion of the first bus to a respective portion of the second bus in response to a respective one of the enable signals.

2. In a data processing system comprising first and second buses, wherein the second bus is a $2^x$ sub-multiple of the first bus, x being a predetermined positive integer, a method for interfacing the first bus to the second bus, comprising:
  receiving as a size control signal (x−1) least significant bits of a control address and a decode control signal;
  providing a size select signal indicative of the number y of consecutive least significant bits of the size control signal which are equal to logic one (1);
  providing $2^x$ enable signals indicative of the encoding of the (x−y) most significant bits of the x control address bits; and
  coupling a selected portion of the first bus to a respective portion of the second bus in response to each of the enable signals.

3. A circuit for interfacing a first data bus size to simultaneously accomodate $2^x$ units of data to a second data bus sized to accomodate $2^y$ units of data, where x and y are positive integers and y is less than or equal to x, the circuit comprising:

size decode means for receiving as a size control signal the (x−1) least significant bits of a control address and a decode control signal, the size decoder providing a size select signal indicative of the number y of consecutive least significant bits of the size control signal which are equal to logic one (1);

address decoder means, responsive to the size select signal, for receiving the x control address bits, the address decode means providing $2^x$ unit enable signals indicative of the encoding of the (x−y) most significant bits of the x control address bits; and $2^x$ sets of buffers, each set responsive to a respective one of the unit enable signals, for coupling each unit of the first bus to a selected unit of the second bus in response to a respective one of the unit enable signals.

4. A method for interfacing a first data bus sized to simultaneously accomodate $2^x$ units of data to a second data bus sized to accomodate $2^y$ units of data, where x and y are positive integers and y is less than or equal to x, comprising the steps of:

receiving as a size control signal the (x−1) least significant bits of a control address and a decode control signal;

providing a size select signal indicative of the number y of consecutive least significant bits of the size control signal which are equal to logic one (1);

providing $2^x$ unit enable signals indicative of the encoding of the (x−y) most significant bits of the x control address bits; and coupling each unit of the first bus to a selected unit of the second bus in response to a respective one of the unit enable signals.

* * * * *

UNITED STATES PATENT AND TRADEMARK OFFICE
CERTIFICATE OF CORRECTION

PATENT NO. : 4,683,534
DATED : July 28, 1987
INVENTOR(S) : Donald L. Tietjen et al It is certified that error appears in the above-identified patent and that said Letters Patent is hereby corrected as shown below:

In the claims:

Column 4, line 37, change "decoder" to --decode--;

Column 4, line 43, change "$2^2$" to --$2^x$--; and

Column 4, line 57, after "signal" insert --the--.

Signed and Sealed this

Ninth Day of February, 1988

Attest:

DONALD J. QUIGG

*Attesting Officer*      *Commissioner of Patents and Trademarks*